(12) United States Patent
Kishimoto et al.

(10) Patent No.: US 7,169,443 B2
(45) Date of Patent: Jan. 30, 2007

(54) POWDER COATED WITH TITANIA FILM AND METHOD FOR PRODUCTION THEREOF

(75) Inventors: Akira Kishimoto, Nishitama-gun (JP); Takafumi Atarashi, Nishitama-gun (JP); Katsuto Nakatsuka, 3-5-1403, Moniwadai 4-chome, Taihaku-ku, Sendai-shi, Miyagi, 982-0252 (JP)

(73) Assignees: Nittetsu Mining Co., Ltd., Tokyo (JP); Katsuto Nakatsuka, Miyagi (JP)

( * ) Notice: Subject to any disclaimer, the term of this patent is extended or adjusted under 35 U.S.C. 154(b) by 21 days.

(21) Appl. No.: 10/491,370

(22) PCT Filed: Oct. 1, 2002

(86) PCT No.: PCT/JP02/10209

§ 371 (c)(1),
(2), (4) Date: Mar. 31, 2004

(87) PCT Pub. No.: WO03/031683

PCT Pub. Date: Apr. 17, 2003

(65) Prior Publication Data
US 2004/0234768 A1 Nov. 25, 2004

(30) Foreign Application Priority Data
Oct. 4, 2001 (JP) .............................. 2001-308682

(51) Int. Cl.
*B05D 1/34* (2006.01)
(52) U.S. Cl. ...................... 427/215; 427/218; 427/299

(58) Field of Classification Search ................. 427/212, 427/215, 218, 299
See application file for complete search history.

(56) References Cited

U.S. PATENT DOCUMENTS

| | | | |
|---|---|---|---|
| 5,759,251 A * | 6/1998 | Nakamura et al. | 106/286.4 |
| 6,235,401 B1 * | 5/2001 | Ogata et al. | 428/472 |
| 6,602,918 B1 * | 8/2003 | Ichinose | 516/90 |
| 6,736,890 B2 * | 5/2004 | Haruta et al. | 106/287.19 |
| 6,864,415 B2 * | 3/2005 | Koyanagi et al. | 136/256 |
| 6,881,254 B2 * | 4/2005 | Akui et al. | 106/287.19 |

FOREIGN PATENT DOCUMENTS

| | | |
|---|---|---|
| EP | 0609897 A2 | 8/1994 |
| EP | 0 851 515 A2 | 7/1998 |
| JP | 5-286738 A | 11/1993 |
| JP | 9-187721 A | 7/1997 |
| JP | 10-330644 A | 12/1998 |
| JP | 2000-345072 A | 12/2000 |
| JP | 2002-110261 A | 4/2002 |

OTHER PUBLICATIONS

Supplementary European Search Report dated Apr. 5, 2005.
European Office Action for Application No. 02 772 961.5-2122 dated Jul. 13, 2005.

* cited by examiner

*Primary Examiner*—H. Thi Le
(74) *Attorney, Agent, or Firm*—Sughrue Mion, PLLC (57) ABSTRACT

A titania film-coated powder comprising a base particle having provided thereon at least one titania film, wherein the base particle is coated with the titania film by suspending the base particle in a buffer solution having a pH of from 7.0 to 12.0 to obtain a suspension, and adding a hydrogen peroxide-ammonia mixture solution containing peroxotitanic acid to the suspension to thereby regulate a titania deposition reaction induced by decomposition of the peroxotitanic acid in the suspension.

3 Claims, 3 Drawing Sheets

POWDER COATED WITH TITANIA FILM AND METHOD FOR PRODUCTION THEREOF

TECHNICAL FIELD

The present invention relates to a titania film-coated powder and a process for producing the same. More particularly, the invention relates to a titania film-coated powder usable for various purposes such as photocatalyst powders, pigment powders colored in blue or purplish red for use in color inks or color toners, filler powders for plastics or paper, and powders for cosmetics, and to a process for producing the same.

BACKGROUND ART

Hitherto, the present inventors have developed and disclosed a method of coloring a black magnetic powder by coating the black magnetic powder with an interference film comprising silica/titania (hereinafter referred to also as titanium oxide) (e.g., JP-A-10-330644).

The inventors have further developed and disclosed methods for coating base particles, e.g., an iron powder, with a titania film, which include: a method of coating with a titania (hereinafter referred to also as titanium oxide) film in a liquid phase by the hydrolysis reaction of a metal alkoxide (e.g., JP-A-6-228604); and a method of coating with a titanium oxide film in a liquid phase by the neutralizing hydrolysis reaction of a metal salt using a titanyl sulfate solution (e.g., JP-A-2000-345072). Besides these, a method of coating with a titanium oxide film in a liquid phase by the thermal hydrolysis reaction of a metal salt using a titanium (IV) chloride solution (e.g., JP-A-5-286738) has been disclosed.

Incidentally, the methods of coating with a titanium oxide film or the like which have been developed by the present inventors have various problems.

In the case where a metal alkoxide is used as a feed material for a titanium oxide coating film, there have been problems, for example, that since the hydrolysis reaction of the metal alkoxide proceeds exceedingly rapidly, the reaction system should be kept at a constant temperature and a constant humidity, that the metal alkoxide used as a feed material is expensive, and that it is necessary to use as a reaction solvent an organic solvent which is a hazardous substance, e.g., an alcohol, and the cost of explosion-proof equipment or the like is high.

On the other hand, the method of coating with a titanium oxide film in a liquid phase by the neutralizing hydrolysis reaction of a metal salt has a drawback that the base particle suspension becomes acidic in an initial stage or final state of the reaction. Furthermore, the method of coating with a titanium oxide film in a liquid phase by the thermal hydrolysis reaction of a metal salt has a drawback that the base particle suspension becomes acidic at high temperatures.

In the method of coating with a titanium oxide film by the neutralizing hydrolysis reaction of a metal salt, it has been difficult to use an iron powder, which is highly corrodible in acid environments, or the like as the base.

DISCLOSURE OF THE INVENTION

The invention, which is to overcome the drawbacks of the related-art techniques described above, hence provides a titania film-coated powder which is safe and inexpensive and for which an iron powder, which is highly corrodible in acid environments, or the like can be easily used as the base. The invention further provides a process for producing the coated powder.

As a result of intensive investigations, the present inventors have succeeded in eliminating those problems by employing the following constitutions.

Namely, the invention is as follows.

(1) A titania film-coated powder comprising a base particle having provided thereon at least one titania film, wherein the base particle is coated with the titania film by suspending the base particle in a buffer solution having a pH of from 7.0 to 12.0 to obtain a suspension, and adding a hydrogen peroxide-ammonia mixture solution containing peroxotitanic acid to the suspension to thereby regulate a titania deposition reaction induced by decomposition of the peroxotitanic acid in the suspension.

(2) The titania film-coated powder according to the above (1), wherein the hydrogen peroxide-ammonia mixture solution containing peroxotitanic acid has a pH of from 7.0 to 12.0.

(3) The titania film-coated powder according to the above (1), wherein the titania film on the base particle has a thickness of from 10 to 1,000 nm.

(4) A process for producing a titania film-coated powder comprising a base particle having provided thereon at least one titania film, which comprises suspending a base particle in a buffer solution having a pH of from 7.0 to 12.0 to obtain a suspension, and adding a hydrogen peroxide-ammonia mixture solution containing peroxotitanic acid to the suspension to thereby regulate a titania deposition reaction induced by decomposition of the peroxotitanic acid in the suspension, and to coat the base particle with a titania film.

(5) The process for producing a titania film-coated powder according to the above (4), wherein the hydrogen peroxide-ammonia mixture solution containing peroxotitanic acid has a pH of from 7.0 to 12.0.

(6) The process for producing a titania film-coated powder according to the above (4), wherein the titania film on the base particle has a thickness of from 10 to 1,000 nm.

The titania film-coated powder and the process for producing the same of the invention have advantages that a film-forming reaction can be conducted at an ordinary temperature of from 5 to 50° C. while keeping a base particle suspension in a neutral or weakly alkaline state with a pH of from 7.0 to 12.0, and that even when an iron powder, which is highly corrodible in acid environments, or the like is used as a base, this base can be coated with a film without altering the base.

Furthermore, in the titania film-coated powder and process for producing the same of the invention, bases which dissolve away under acid conditions with a pH of 5 or lower, such as, e.g., calcium carbonate, can be used as the base particles besides iron powders and the like which are highly corrodible in acid environments.

BEST MODE FOR CARRYING OUT THE INVENTION

The base particle to be used in producing the titania film-coated powder of the invention are not particularly limited. The base particles may be a metal-containing inorganic material or an organic material, or may be any of a magnetic material, dielectric material, conductive material, insulating material, and the like. In the case where the base is a metal, it may be any metal such as, e.g., iron, nickel, chromium, titanium, or aluminum. However, in the case where the magnetic properties of a base are to be utilized, it is preferred to use one which can have magnetic properties, e.g., iron. These metals may be alloys. In the case where a base having magnetic properties is used as stated above, it preferably is a ferromagnetic alloy.

In the case where the base of the powder is a metal compound, typical examples thereof include oxides of the aforementioned metals. For example, use may be made of oxides of iron, nickel, chromium, titanium, aluminum, silicon, and the like, oxides of calcium, magnesium, barium, and the like, or composite oxides of these. Examples of metal compounds other than metal oxides include metal nitrides, metal carbides, metal sulfides, metal fluorides, metal carbonates, metal phosphates, and the like.

Furthermore, a base particle usable besides metallic ones is compounds, in particular, oxides, carbides, or nitrides, of metalloids or nonmetals, such as silica and glass beads. Other usable inorganic materials include inorganic hollow particles such as Shirasu balloons (hollow silicate particles), hollow carbon microspheres (Kreca Sphere), fused alumina bubbles, Aerosil, white carbon, hollow silica microspheres, hollow calcium carbonate microspheres, calcium carbonate, perlite, talc, bentonite, micas such as synthetic mica and commonmica, kaolin, and the like.

Preferred organic materials are resin particles. Examples of the resin particles include cellulose powders, cellulose acetate powders, polyamides, epoxy resins, polyesters, melamine resins, polyurethanes, vinyl acetate resins, silicon resins, and spherical or crushed particles obtained by the polymerization or copolymerization of acrylic esters, methacrylic esters, styrene, ethylene, propylene, and derivatives thereof. Especially preferred resin particles are spherical acrylic resin particles obtained by the polymerization of acrylic acid or a methacrylic ester.

Examples of the shape of the base include spherical bodies, nearly spherical bodies, isotropic bodies, e.g., regular polyhedrons, rectangular parallelepipeds, spheroids, and polyhedrons such as rhombohedrons, platy bodies, and acicular bodies (cylinders and prisms). Powders made up of particles of an utterly irregular shape, such as crushed particles, are also usable. Although these bases are not particularly limited in particle diameter, they preferably have a particle diameter in the range of from 0.01 µm to several millimeters.

The buffer solution to be used for suspending base particles therein in producing the titania film-coated powder of the invention is not particularly limited as long as it is a neutral or weakly alkaline one having a pH of from 7.0 to 12.0. Examples thereof include tris systems, boric acid systems, boric acid salt systems, phosphoric acid systems, phosphoric acid salt systems, glycine systems, carbonic acid salt systems, and the like.

The hydrogen peroxide-ammonia mixture solution containing peroxotitanic acid to be used in producing the titania film-coated powder of the invention is not particularly limited. It is, however, preferred that this solution have a higher pH than the buffer solution in which base particles are to be suspended.

Methods for preparing the mixture solution are not particularly limited. Examples thereof include the following methods.

(1) A method in which a feed material generating titanium hydroxide upon mixing with ammonia water only (hereinafter referred to also as titanium source), such as a titanium alkoxide, titanium chloride solution, or titanium sulfate solution, is mixed with ammonia water and an aqueous hydrogen peroxide solution to thereby directly prepare the mixture solution.

The valence of the titanium in the titanium source to be used in the method described above is not limited to 4, and may be 3. For example, titanium(III) chloride can be used.

(2) A method in which a commercial product in the form of a yellow transparent solution already containing peroxotitanic acid, such as trade name "New TAS Fine", manufactured by Furuuchi Chemical Laboratories, Ltd., or trade name "PTA Solution", manufactured by Tanaka Tensha based on Japanese Patent No. 2,938,376, is mixed with ammonia water and an aqueous hydrogen peroxide solution to thereby prepare the mixture solution.

In producing the titania film-coated powder of the invention, the hydrogen peroxide-ammonia mixture solution containing peroxotitanic acid is added to the suspension of base particles to conduct a titania deposition reaction, which is induced by the decomposition of the peroxotitanic acid. The reaction temperature in this operation is not particularly limited.

On the contrary, an advantage of the invention resides in that the film-forming reaction can be conducted at an ordinary temperature of from 5 to 50° C. while keeping the base particleuspension in a neutral or weakly alkaline state with a pH of from 7.0 to 12.0.

In the invention, the titanium oxide film formed by the decomposition reaction of a peroxotitanium complex can be deposited as a transparent film in combination with one or more transparent films of a metal hydroxide, metal oxide, or the like to thereby form a coating film composed of two or more layers. In this case, by regulating the thickness of each layer of the multilayered coating film (film layers which cover the base particle and are capable of participating in light interference), a special function can be imparted.

For example, base particles are coated with many layers comprising the titania film and films of one or more other substances to form a light-interference multilayered thin film. Thus, without using any pigment or dye, the powder can be colored in a desired bright tint based on wavelength-selective light reflection.

In this case, it is necessary to select beforehand the material of base particles, shape of the base particle, particle diameter of the base particle, number of coating layers, sequence of deposition of the coating layers, material of each coating layer, and desired wavelength of reflected light.

In particular, to select the materials of base particles and of coating layers means to specify the complex indexes of refraction of these.

To specify the complex indexes of refraction of the base particle and the coating layers is related to the calculation of the coefficient of Fresnel reflection between the layers and the intensity of amplitude reflection between the layers.

There are cases where selection of a base particle shape results in the necessity of the correction based on particle shape which will be described later.

By selecting a particle diameter of the base particle, the curvatures of the base particle and of the multilayered film are specified. In case where the curvatures thereof are not specified, it is difficult to conduct the correction of spectrophotometric properties for film thickness monitoring which will be described later.

To select the number of coating layers is related to specifying the value of $R_{flat}$ which will be described later. In the case where the base particle are a flat platy material, the multilayered-film reflection intensity $R_{flat}$ is determined by introducing the values of the material of base particles (complex index of refraction), number of coating layers, sequence of deposition of the coating layers, materials of the respective coating layers (complex indexes of refraction), and desired wavelength of reflected light which have been selected beforehand into the following recurrence formula 1 and solving the formula.

$$R_{j+1,j} = \frac{r_{j+1,j} + R_{j,j-1}\exp(-2i\delta_j)}{1 + r_{j+1,j}R_{j,j-1}\exp(-2i\delta_j)}$$ (Formula 1)

$$2\delta_j = \frac{4\pi}{\lambda} n_j d_j \cos\phi_j$$

(In the formula, $R_{j+1,j}$: amplitude reflection intensity between the "j"th layer from the lowest layer and the layer directly overlying the same, j: integer of 1 or larger (j−1=0 indicates the base), i: imaginary number unit, $r_{j+1,j}$: Fresnel reflection coefficient for the interface between the "j"th layer from the lowest layer and the layer directly overlying the same, $R_{j,j-1}$: amplitude reflection intensity between the "j−1"th layer from the lowest layer and the layer directly overlying the same, $2\delta_j$: phase difference in the "j"th layer from the lowest layer, λ: desired wavelength of reflected light, $n_j$: complex index of refraction of the "j"th layer from the lowest layer, $d_j$: thickness of the "j"th layer from the lowest layer, $\phi_j$: angle of light incidence on the "j"th layer from the lowest layer.)

Methods for correcting the thus-obtained value of multilayered-film reflection intensity $R_{flat}$ based on the shape of the base particle are not particularly limited. However, in the case where the particle shape is spherical, nearly spherical, or irregular, a preferred method is to introduce the value of $R_{flat}$ into the following formula 2:

$$R(\lambda) = \int_0^{\frac{\pi}{2}} \sin 2\theta \cdot R_{flat}(\lambda, \theta) \cdot d\theta$$ (Formula 2)

(wherein θ indicates the angle of incidence to the outermost layer) and determine the thickness of each coating layer so that the value of R(λ) becomes maximum or minimum at the desired wavelength. To introduce the value of $R_{flat}$ into formula 2 means to correct the solution of formula 1 by approximating the distribution of angles of light incidence on the multilayered-film-coated powder to the distribution of angles of light incidence on one coated hemisphere.

The determination of the thickness of each coating layer described above can be efficiently accomplished through a simulation with a computer. Subsequently, each coating film is deposited on the base particle so as to result in the film thickness determined by the method described above.

However, the following should be noted. In an actual film-depositing operation for producing a multilayered-film-coated powder, it is impossible to conduct film deposition just to the thickness as designed while directly monitoring the actual film thickness, as stated above. In view of this, use may be made of a method in which in place of monitoring film thickness during a film-depositing operation, the wavelength at which the reflection intensity for the object coated with each coating layer is maximum or minimum is measured with a spectrophotometer, and at the time when the wavelength for maximum or minimum reflection reaches a value corresponding to the target film thickness, the film-depositing operation is terminated.

However, in the case where the base is a powder, the relationship between the found value of the wavelength for maximum or minimum reflection and film thickness changes with the curvature of each coating layer, which depends on the shape of the particles and the particle diameter. This poses a problem that when films are deposited so that the wavelength for maximum or minimum reflection measured with a spectrophotometer becomes the target value, then the multilayered-film-coated powder finally obtained does not show the desired reflection intensity at the desired wavelength. It is therefore necessary to conduct correction based on the curvature of each coating layer, which depends on the shape and diameter of the base particle.

Methods for this correction are not particularly limited. However, it is preferred to use a method which comprises: coating selected base particles with each of selected coating layers in several thicknesses differing gradationally to thereby obtain film-coated powders for particle diameter correction; measuring the actual thickness ($d_M$) of each of the coating layers of the film-coated powders for particle diameter correction; examining each film-coated powder with a spectrophotometer to determine the optical thickness (nd) of each of the coating layers of each film-coated powder for particle diameter correction; determining the ratio of the optical thickness (nd) of each of the coating layers of each film-coated powder for particle diameter correction to the product ($nd_M$) of the actual thickness of the coating layer and the real number term (n) of complex index of refraction, i.e., $nd/nd_M$; multiplying the ratio ($nd/nd_M$) by the value of $2\delta_j$ in recurrence formula 1 for determining multilayered-film reflection intensity to correct the spectrophotometric properties of the powder having the coating layers; and depositing the coating layers so as to result in the corrected spectrophotometric properties.

Incidentally, methods for measuring the actual thickness ($d_M$) of each of the coating layers of the film-coated powders for particle diameter correction are not particularly limited. It is, however, preferred to measure the thickness by examining sections obtained by cutting particles of each film-coated powder for particle diameter correction.

Use of focusing ion beam (FIB) processing for the cutting of particles of the film-coated powders for particle diameter correction is preferred for the measurement of the actual thickness ($d_M$) of each coating layer because the sections are clear.

Subsequently, a multilayered-film-coated powder is produced so that each coating film has the corrected spectrophotometric properties determined by the method described above.

For obtaining a bright powder colored in a desired tint by coating with a light-interference multilayered thin film, multilayer coating is preferably conducted by the method described above. However, for the mere calculation of the thickness of a single-layer film deposited on base particles from spectrophotometric properties with a tolerance of about 10%, the following formula 3 may be used, which is derived from formula 1 when the imaginary number term of complex index of refraction is 0 and when j=1 and φ=0.

$$nd = (k/4)\lambda \quad \text{(Formula 3)}$$

(In the formula, n is the real number term of the complex index of refraction of the single-layer film; k is the order of interference; and λ is peak or valley wavelength.)

EXAMPLES

The invention will be explained below in more detail by reference to Examples, but the scope of the invention should not, of course, be construed as being limited to these.

Example 1

Production of Titania Film-Coated Permalloy Powder

Sample 1

Preparation of Buffer Solution Containing Suspended Base Particle

In deionized water were dissolved 29.8 g of potassium chloride (manufactured by Kanto Chemical Co., Ltd.; shika, first-class grade chemical) and 24.7 g of boric acid (manufactured by Kanto Chemical Co., Ltd.; shika, first-class grade chemical). The liquid amount was adjusted to 1 L. Thus, a 0.4 mol/L potassium chloride-boric acid mixture solution (hereinafter referred to as solution A) was obtained.

Subsequently, 16.0 g of sodium hydroxide (manufactured by Kanto Chemical Co., Ltd.; shika, first-class grade chemical) was dissolved in deionized water and the liquid amount was adjusted to 1 L. Thus, a 0.4 mol/L sodium hydroxide solution (hereinafter referred to as solution B) was obtained.

Two hundred grams of solution A was mixed with 80 g of solution B to prepare a buffer solution for suspending base particle therein. This buffer solution for suspending base particle had a pH of 9.1. In this buffer solution was suspended 30 g of a flaky permalloy powder (trade name, 78 Permalloy Flake; manufactured by Fukuda Foil & Powder Co., Ltd.) having an average particle diameter of 17.4 μm (measured with particle size analyzer Microtrack HRA Type 9320-X100; manufactured by HONEYWELL Inc.). Thus, a buffer solution containing base particle suspended therein was obtained.

Preparation of Dropping Liquid

A yellow transparent solution containing peroxotitanic acid (hereinafter referred to as dropping liquid) was obtained by mixing 13.3 g of a 20% titanium(III) chloride solution (manufactured by Kanto Chemical Co., Ltd.; shika, first-class grade chemical), 27.3 g of 28% ammonia water (manufactured by Kanto Chemical Co., Ltd.; shika, first-class grade chemical), and 13.3 g of 31% hydrogen peroxide (manufactured by Kanto Chemical Co., Ltd.; special grade chemical). This dropping liquid had a pH of 10.0.

Coating with Titania Film

The dropping liquid was wholly added dropwise at a feed rate of 1.5 mL/min to the buffer solution containing suspended base particle with stirring, and the resultant mixture was aged for 2 hours. Thus, titania was yielded from the peroxotitanic acid in the liquid and deposited on the surface of the base particle, whereby the base particle were coated with a titania film.

After the aging, the stirring was stopped to allow the particle in the suspension to sediment, and the supernatant was removed. The supernatant was colorless and transparent.

The particle was further subjected to washing with deionized water by decantation and then dried at 120° C. for 2 hours to obtain a titania film-coated permalloy powder.

Samples 2, 3, 4, 5, and 6

The same conditions as for sample 1 were used, except for the amount of the base particle suspended and the composition of the dropping liquid. The amounts of the base particle suspended and the dropping liquid compositions for samples 1 to 6 are shown in Table 1.

TABLE 1

Amount of base particle suspended and composition of dropping liquid

|  | Amount of base particle (g) | Amount of titanium chloride solution (g) | Amount of ammonia water (g) | Amount of hydrogen peroxide (g) |
|---|---|---|---|---|
| Sample 1 | 40 | 8.3 | 17.1 | 8.3 |
| Sample 2 | 40 | 13.3 | 27.3 | 13.3 |
| Sample 3 | 40 | 16.7 | 34.2 | 16.7 |
| Sample 4 | 30 | 16.7 | 34.2 | 16.7 |
| Sample 5 | 20 | 16.7 | 34.2 | 16.7 |
| Sample 6 | 4 | 16.7 | 34.2 | 16.7 |

Evaluation Results

Figure 1:
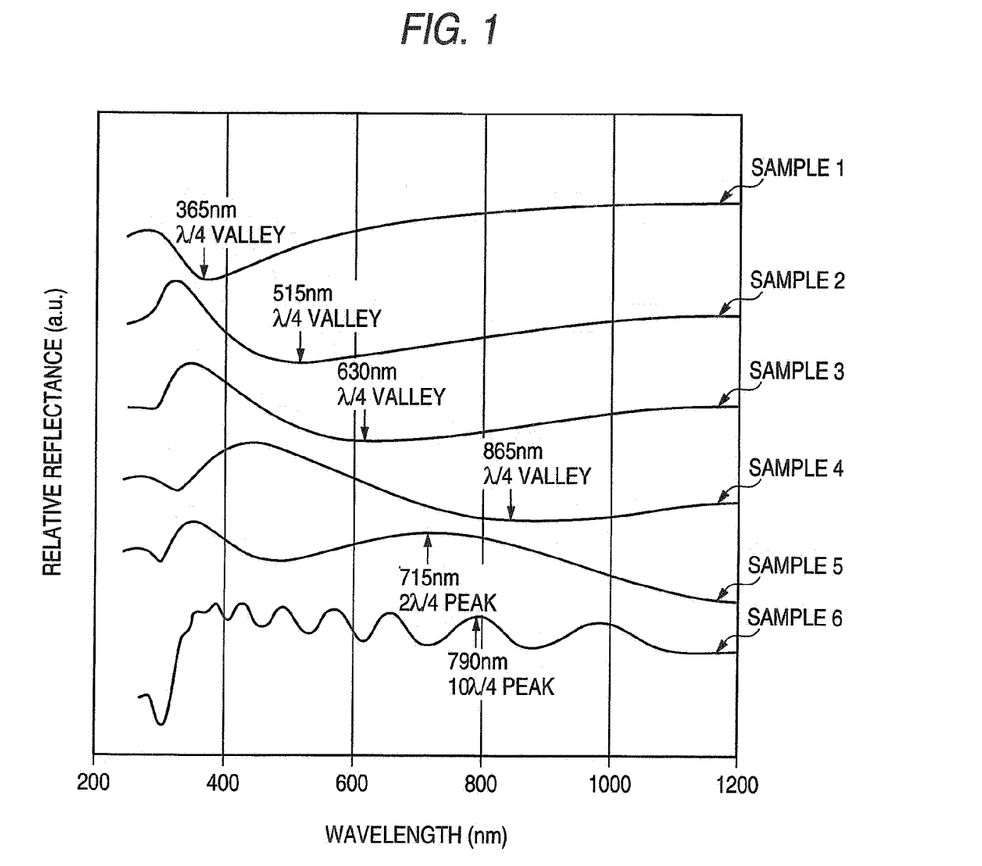
FIG. 1 is an illustration showing spectral reflectance curves for the titania film-coated permalloy powders obtained in Example 1.

Spectral reflectance curves obtained through examination with a spectrophotometer for ultraviolet/visible/near infrared regions (Type V-570 with integrating sphere Type ILN-472; manufactured by Japan Spectroscopic Co., Ltd.) are shown in FIG. 1.

The film thicknesses calculated from peak and bottom wavelengths in the curves shown in FIG. 1 (assuming that the real number term of the complex index of refraction of a titania film which had not undergone heat treatment was 2.0) and the magnetizations as determined in an applied magnetic field of 1 kOe are shown in Table 2. The magnetizations in an applied magnetic field of 1 kOe were measured with a sample-vibrating magnetometer (Type TM-VSM1014-MRO-N; manufactured by Tamagawa Seisakusho Co., Ltd.). The film thicknesses were calculated using the following equation.

$$nd = k/4\lambda$$

(n is the real number term of the complex index of refraction of the titania film; k is the order of interference; and λ is peak or valley wavelength.)

TABLE 2

Film thickness calculated from peak and bottom wavelengths in spectral reflectance curve and magnetization in applied magnetic field of 1 kOe

|  | Film thickness (nm) | Magnetization in applied magnetic field of 1 kOe (emu/g) |
|---|---|---|
| Base particles |  | 59.6 |
| Sample 1 | 46 | 58.4 |
| Sample 2 | 64 | 57.7 |
| Sample 3 | 79 | 57.3 |
| Sample 4 | 108 | 56.6 |

TABLE 2-continued

Film thickness calculated from peak and bottom wavelengths in spectral reflectance curve and magnetization in applied magnetic field of 1 kOe

| | Film thickness (nm) | Magnetization in applied magnetic field of 1 kOe (emu/g) |
|---|---|---|
| Sample 5 | 179 | 55.3 |
| Sample 6 | 988 | 35.5 |

Example 2

Production of Titania Film-Coated Spherical Iron Powder

Sample 1

Preparation of Buffer Solution Containing Suspended Base Particle

Forty grams of a spherical iron powder (trade name, ES; manufactured by BASF AG) having an average particle diameter of 3.3 μm (measured by BASF AG) was suspended in the buffer solution for suspending base particles obtained in Example 1. Thus, a buffer solution containing base particle suspended therein was obtained.

Preparation of Dropping Liquid

A yellow transparent dropping liquid containing peroxotitanic acid was obtained by mixing 10.0 g of a 20% titanium(III) chloride solution (manufactured by Kanto Chemical Co., Ltd.; shika, first-class grade chemical), 20.5 g of 28% ammonia water (manufactured by Kanto Chemical Co., Ltd.; shika, first-class grade chemical), and 10.0 g of 31% hydrogen peroxide (manufactured by Kanto Chemical Co., Ltd.; special grade chemical). This dropping liquid had a pH of 10.0.

Coating with Titania Film

The dropping liquid was wholly added dropwise at a feed rate of 1.5 mL/min to the buffer solution containing suspended base particle with stirring, and the resultant mixture was aged for 2 hours. Thus, titania was yielded from the peroxotitanic acid in the liquid and deposited on the surface of the base particle, whereby the base particle were coated with a titania film.

After the aging, the stirring was stopped to allow the particles in the suspension to sediment, and the supernatant was removed. The supernatant was colorless and transparent.

The particles were further subjected to washing with deionized water by decantation and then dried at 120° C. for 2 hours to obtain a titania film-coated iron powder.

Samples 2 and 3

The same conditions as for sample 1 were used, except for the composition of the dropping liquid. The dropping liquid compositions for samples 1 to 3 are shown in Table 3.

TABLE 3

| | Composition of dropping liquid | | |
|---|---|---|---|
| | Amount of titanium chloride solution (g) | Amount of ammonia water (g) | Amount of hydrogen peroxide (g) |
| Sample 1 | 10.0 | 20.5 | 10.0 |
| Sample 2 | 15.0 | 30.8 | 15.0 |
| Sample 3 | 20.0 | 41.0 | 20.0 |

Evaluation Results

Figure 2:
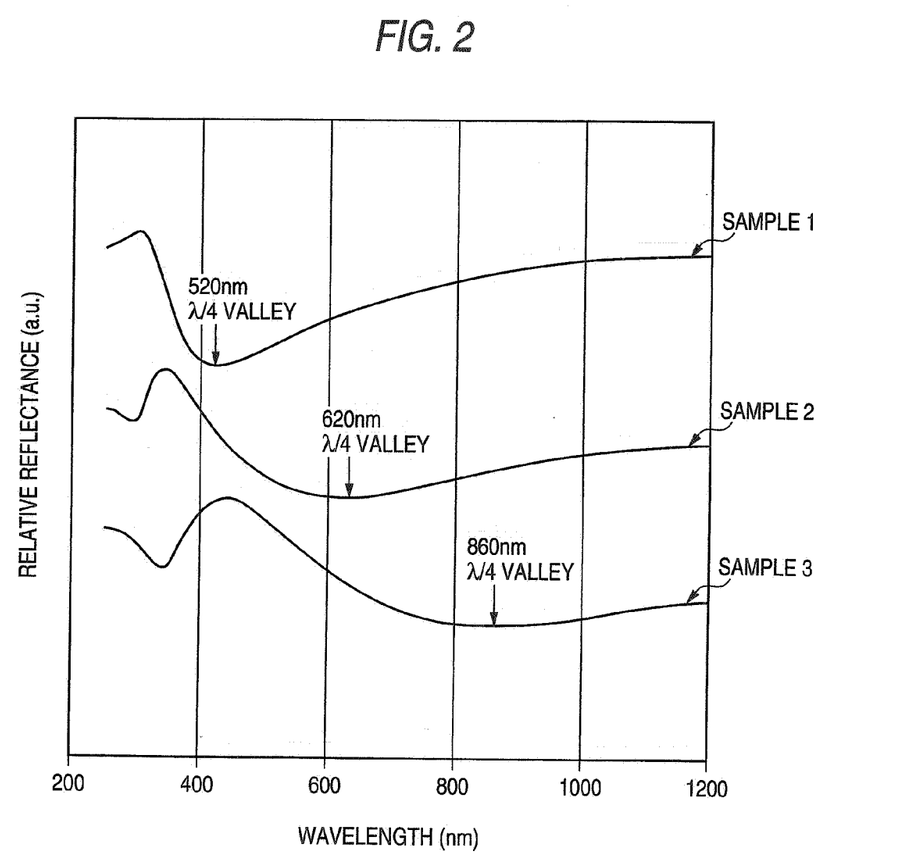
FIG. 2 is an illustration showing spectral reflectance curves for the titania film-coated iron powders obtained in Example 2.

Spectral reflectance curves obtained through examination with a spectrophotometer for ultraviolet/visible/near infrared regions (Type V-570 with integrating sphere Type ILN-472; manufactured by Japan Spectroscopic Co., Ltd.) are shown in FIG. 2.

The film thicknesses calculated from peak and bottom wavelengths in the curves shown in FIG. 2 (assuming that the real number term of the complex index of refraction of a titania film which had not undergone heat treatment was 2.0) and the magnetizations as determined in an applied magnetic field of 1 kOe are shown in Table 4. The magnetizations in an applied magnetic field of 1 kOe were measured with a sample-vibrating magnetometer (Type TM-VSM1014-MRO-N; manufactured by Tamagawa Seisakusho Co., Ltd.). The film thicknesses were calculated using the following equation.

$$nd = k/4\lambda$$

(n is the real number term of the complex index of refraction of the titania film; k is the order of interference; and $\lambda$ is peak or valley wavelength.)

TABLE 4

Film thickness calculated from peak and bottom wavelengths in spectral reflectance curve and magnetization in applied magnetic field of 1 kOe

| | Film thickness (nm) | Magnetization in applied magnetic field of 1 kOe (emu/g) |
|---|---|---|
| Base particle | | 47.9 |
| Sample 1 | 46 | 47.3 |
| Sample 2 | 64 | 47.0 |
| Sample 3 | 79 | 45.1 |

Example 3

Production of Permalloy Powder Coated with Silica/Titania Two-Layer Film

Sample 1

Preparation of Dropping Liquid for Coating with Silica Film

Five grams of sodium silicate (manufactured by Kanto Chemical Co., Ltd.; shika, first-class grade chemical) was dissolved in deionized water, and the liquid amount was adjusted to 100 g. Thus, a dropping liquid for coating with a silica film was obtained.

Preparation of Buffer Solution Containing Suspended Base Particle

Forty grams of the same flaky permalloy powder as that used in Example 1 was suspended in the buffer solution for suspending base particles obtained in Example 1. Thus, a buffer solution containing base particles suspended therein was obtained.

Coating with Silica Film

The dropping liquid for silica film coating was added dropwise in an amount of 75.0 g at a feed rate of 1.0 mL/min to the buffer solution containing suspended base particles with stirring, and the resultant mixture was aged for 2 hours. Thus, silica was yielded from the sodium silicate in the liquid and deposited on the surface of the base particle, whereby the base particle were coated with a silica film.

After the aging, the stirring was stopped to allow the particles in the suspension to sediment, and the supernatant was removed. The supernatant was colorless and transparent.

The particles were further subjected to washing with deionized water by decantation and then dried at 120° C. for 2 hours to obtain silica film-coated permalloy powder.

Preparation of Dropping Liquid for Coating with Titania Film

A yellow transparent dropping liquid for titania film coating which contained peroxotitanic acid was obtained by mixing 5.0 g of a 20% titanium(III) chloride solution (manufactured by Kanto Chemical Co., Ltd.; shika, first-class grade chemical), 10.3 g of 28% ammonia water (manufactured by Kanto Chemical Co., Ltd.; shika, first-class grade chemical), and 5.0 g of 31% hydrogen peroxide (manufactured by Kanto Chemical Co., Ltd.; special grade chemical). This dropping liquid had a pH of 10.0.

Preparation of Buffer Solution Containing Suspended Silica Film-Coated Powder

Thirty grams of the silica film-coated powder obtained in a step described above was suspended in the buffer solution for suspending base particles obtained in Example 1. Thus, a buffer solution containing the silica film-coated powder suspended therein was obtained.

Coating with Titania Film

The dropping liquid for titania film coating was wholly added dropwise at a feed rate of 1.5 mL/min to the buffer solution containing the suspended silica film-coated powder with stirring, and the resultant mixture was aged for 2 hours. Thus, titania was yielded from the peroxotitanic acid in the liquid and deposited on the surface of the silica film-coated powder, whereby the silica film-coated powder was coated with a titania film.

After the aging, the stirring was stopped to allow the particles in the suspension to sediment, and the supernatant was removed. The supernatant was colorless and transparent.

The particles were further subjected to washing with deionized water by decantation and then dried at 120° C. for 2 hours to obtain a permalloy powder coated with a silica/titania two-layer film.

Samples 2, 3, and 4

The same conditions as for sample 1 were used, except for the composition of the dropping liquid for coating with a titania film. The compositions of the dropping liquids for titania film coating for samples 1 to 4 are shown in Table 5.

TABLE 5

Composition of dropping liquid for titania film coating

| | Amount of titanium chloride solution (g) | Amount of ammonia water (g) | Amount of hydrogen peroxide (g) |
|---|---|---|---|
| Sample 1 | 5.0 | 10.3 | 5.0 |
| Sample 2 | 6.7 | 13.7 | 6.7 |
| Sample 3 | 8.3 | 17.1 | 8.3 |
| Sample 4 | 10.0 | 20.5 | 10.0 |

Evaluation Results

Figure 3:
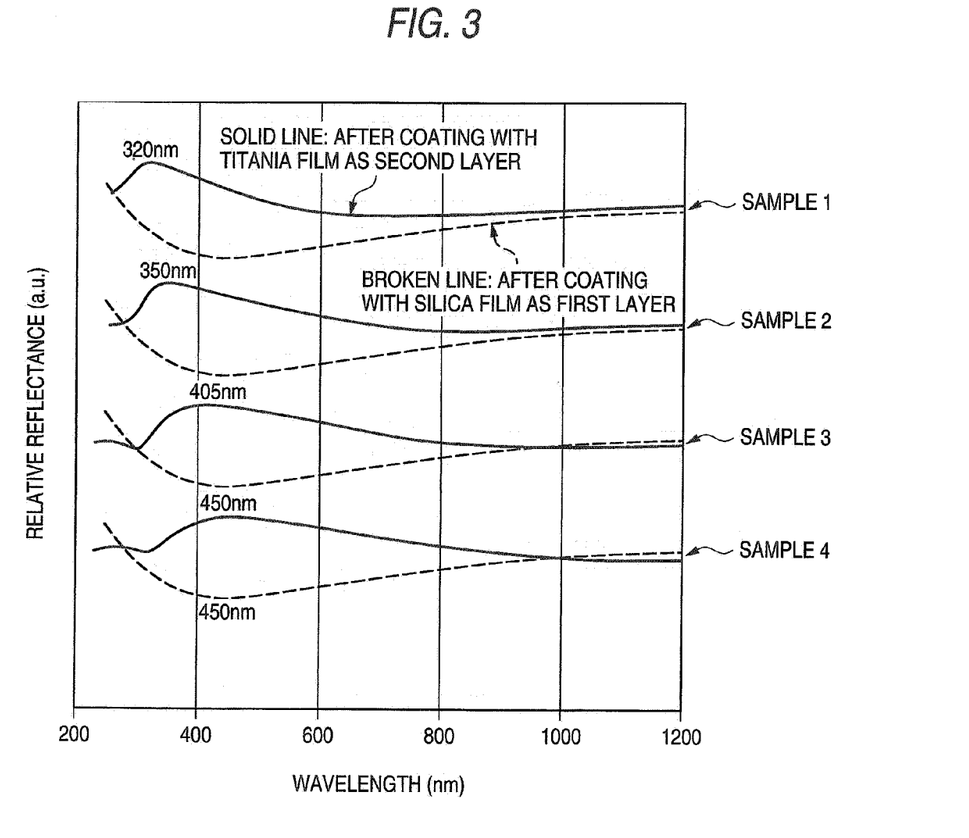
FIG. 3 is an illustration showing spectral reflectance curves for the permalloy powders coated with a silica/titania two-layer film obtained in Example 3.

Spectral reflectance curves obtained through examination with a spectrophotometer for ultraviolet/visible/near infrared regions (Type V-570 with integrating sphere Type ILN-472; manufactured by Japan Spectroscopic Co., Ltd.) are shown in FIG. 3.

The thicknesses of the films were calculated by subjecting the curves in the figure to curve fitting to values of spectral reflectance curve calculated based on the Fresnel theory on the assumption that the complex index of refraction of the permalloy was 2.1–4.0i, which is equal to that of nickel, the real number term of the complex index of refraction of the silica film which had not undergone heat treatment was 1.5, and the real number term of the complex index of refraction of the titania film which had not undergone heat treatment was 2.0.

The calculated values of film thickness and the magnetizations as determined in an applied magnetic field of 1 kOe are shown in Table 6. The magnetizations in an applied magnetic filed of 1 kOe were measured with a sample-vibrating magnetometer (Type TM-VSM1014-MRO-N; manufactured by Tamagawa Seisakusho Co., Ltd.).

TABLE 6

Film thickness calculated from peak and bottom wavelengths in spectral reflectance curve and magnetization in applied magnetic field of 1 kOe

| | Film thickness (nm) | Magnetization in applied magnetic field of 1 kOe (emu/g) |
|---|---|---|
| Base particle | | 59.6 |
| After coating with silica film as first layer | 61 | 57.5 |
| (for each sample) | | |
| Sample 1 | 24 | 56.2 |
| Sample 2 | 32 | 55.8 |
| Sample 3 | 45 | 55.2 |
| Sample 4 | 56 | 54.7 |

Example 4

Production of Titania Film-Coated Calcium Carbonate Powder

Sample 1

Preparation of Buffer Solution Containing Suspended Base Particle

Ten grams of a heavy calcium carbonate powder (trade name, Tankaru F#300; manufactured by Nittetsu Mining Co., Ltd.) having a lightness L* of 96.74 (measured with spectrophotometer Type V-570 for ultraviolet/visible/near infrared regions, equipped with integrating sphere Type ILN-472; manufactured by Japan Spectroscopic Co., Ltd.) was suspended in the buffer solution for suspending base particle obtained in Example 1. Thus, a buffer solution containing base particles suspended therein was obtained.

Preparation of Dropping Liquid

A yellow transparent dropping liquid containing peroxotitanic acid was obtained by mixing 15.0 g of a 20% titanium(III) chloride solution (manufactured by Kanto Chemical Co., Ltd.; shika, first-class grade chemical), 30.8 g of 28% ammonia water (manufactured by Kanto Chemical Co., Ltd.; shika, first-class grade chemical), and 15.0 g of 31% hydrogen peroxide (manufactured by Kanto Chemical Co., Ltd.; special grade chemical). This dropping liquid had a pH of 10.0.

Coating with Titania Film

The dropping liquid was wholly added dropwise at a feed rate of 1.5 mL/min to the buffer solution containing suspended base particle with stirring, and the resultant mixture was aged for 2 hours. Thus, titania was yielded from the peroxotitanic acid in the liquid and deposited on the surface of the base particle, whereby the base particle were coated with a titania film.

After the aging, the stirring was stopped to allow the particle in the suspension to sediment, and the supernatant was removed. The supernatant was colorless and transparent.

The particles were further subjected to washing with deionized water by decantation and then dried at 120° C. for 2 hours to obtain a titania film-coated calcium carbonate powder.

Evaluation Results

The amount of the titania film deposited was 10 wt %. The lightness L* obtained through examination with a spectrophotometer for ultraviolet/visible/near infrared regions (Type V-570 with integrating sphere Type ILN-472; manufactured by Japan Spectroscopic Co., Ltd.) was 97.65.

INDUSTRIAL APPLICABILITY

The titania film-coated powder and the process for producing the same of the invention have advantages that a film-forming reaction can be conducted at an ordinary temperature of from 5 to 50° C. while keeping a base particle suspension in a neutral or weakly alkaline state with a pH of from 7.0 to 12.0, and that even when an iron powder, which is highly corrodible in acid environments, or the like is used as a base, this base can be coated with a film without altering the base. Furthermore, in the titania film-coated powder and process for producing the same of the invention, bases which dissolve away under acid conditions with a pH of 5 or lower, such as, e.g., calcium carbonate, can be used as the base particle besides iron powders and the like which are highly corrodible in acid environments.

The invention claimed is:

1. A process for producing a titania film-coated powder comprising a base particle having provided thereon at least one titania film, which comprises suspending a base particle in a buffer solution having a pH of from 7.0 to 12.0 to obtain a suspension, and adding a hydrogen peroxide-ammonia mixture solution containing peroxotitanic acid to the suspension to thereby regulate a titania deposition reaction induced by decomposition of the peroxotitanic acid in the suspension, and to coat the base particle with a titania film.

2. The process for producing a titania film-coated powder according to claim 1, wherein the hydrogen peroxide-ammonia mixture solution containing peroxotitanic acid has a pH of from 7.0 to 12.0.

3. The process for producing a titania film-coated powder according to claim 1, wherein the titania film on the base particle has a thickness of from 10 to 1,000 nm.

* * * * *

UNITED STATES PATENT AND TRADEMARK OFFICE
CERTIFICATE OF CORRECTION

PATENT NO. : 7,169,443 B2  Page 1 of 1
APPLICATION NO. : 10/491370
DATED : January 30, 2007
INVENTOR(S) : Kishimoto et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (21) days Delete the phrase "by 21" and insert -- by 105--

Signed and Sealed this

Eighteenth Day of December, 2007

JON W. DUDAS
*Director of the United States Patent and Trademark Office*